(12) United States Patent
Kravitz

(10) Patent No.: US 10,644,875 B2
(45) Date of Patent: May 5, 2020

(54) PRE-AUTHORIZATION OF PUBLIC KEY INFRASTRUCTURE

(71) Applicant: International Business Machines Corporation, Armonk, NY (US)

(72) Inventor: David William Kravitz, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 86 days.

(21) Appl. No.: 15/141,383

(22) Filed: Apr. 28, 2016

(65) Prior Publication Data

US 2017/0317817 A1 Nov. 2, 2017

(51) Int. Cl.
*H04L 9/00* (2006.01)
*H04L 29/06* (2006.01)
*H04L 9/08* (2006.01)

(52) U.S. Cl.
CPC ............ *H04L 9/006* (2013.01); *H04L 9/0825* (2013.01); *H04L 63/061* (2013.01); *H04L 2209/603* (2013.01); *H04L 2209/76* (2013.01)

(58) Field of Classification Search
CPC ..................................................... H04L 9/006
USPC ........................................................ 713/168
See application file for complete search history.

(56) References Cited

U.S. PATENT DOCUMENTS 8,826,006 B2  9/2014 Guo et al.
8,887,251 B2  11/2014 Lei et al.
2002/0157019 A1* 10/2002 Kadyk ................ H04L 63/0281
  726/4
2002/0166048 A1* 11/2002 Coulier ............... H04L 63/0435
  713/169
2003/0061355 A1*  3/2003 Yang ....................... H04L 67/02
  709/227
2004/0093419 A1*  5/2004 Weihl ..................... H04L 63/06
  709/229

(Continued)

OTHER PUBLICATIONS

Mazzocca, N. et al., "Architecture and Protocols of a Public Key Infrastructure for the Public Administration", Rivista Di Informatica, 1999, 12 pages, vol. 29, Issue 2, Masson Italia Periodici SRL, Italy.

(Continued)

*Primary Examiner* — Peter C Shaw
(74) *Attorney, Agent, or Firm* — Ference & Associates LLC

(57) ABSTRACT

One embodiment provides a method for pre-authorizing public key infrastructure communication between entities, the method comprising: utilizing at least one processor to execute computer code that performs the steps of: determining if pre-authorization is required from a remote device to establish a communication channel between a first entity and a second entity; establishing a shared secret value between the first entity and the remote device; receiving, at the second entity, from the remote device, proof of pre-authorization, thereby pre-authorizing communication between the first and second entity, wherein the pre-authorization is based on the shared secret value; and storing the proof of pre-authorization for any subsequent communication with the first entity. Other aspects are described and claimed.

16 Claims, 4 Drawing Sheets

(56) References Cited

U.S. PATENT DOCUMENTS

| | | | | |
|---|---|---|---|---|
| 2005/0278259 | A1* | 12/2005 | Gunaseelan | G06F 21/10 705/59 |
| 2006/0198517 | A1* | 9/2006 | Cameron | G06F 21/445 380/44 |
| 2006/0248082 | A1* | 11/2006 | Raikar | H04L 9/32 |
| 2008/0178274 | A1 | 7/2008 | Nakhjiri et al. | |
| 2008/0289019 | A1 | 11/2008 | Lam | |
| 2009/0011828 | A1* | 1/2009 | Treffers | G06F 21/10 463/29 |
| 2010/0254533 | A1* | 10/2010 | McCullough | H04L 9/12 380/44 |
| 2011/0225417 | A1* | 9/2011 | Maharajh | G06F 21/10 713/150 |
| 2014/0115655 | A1* | 4/2014 | Marvais | H04L 41/0893 726/1 |
| 2014/0181892 | A1* | 6/2014 | Von Bokern | H04L 63/102 726/1 |
| 2015/0058960 | A1 | 2/2015 | Schmoyer et al. | |
| 2015/0095999 | A1* | 4/2015 | Toth | H04L 63/08 726/6 |
| 2015/0350167 | A1* | 12/2015 | Djakovic | H04L 63/0428 713/163 |
| 2017/0141926 | A1 | 5/2017 | Xu et al. | |

OTHER PUBLICATIONS

Internet Society Requests for Comment, Trust Anchor Management Requirements (RFC6024), IP.com No. 000200710, Oct. 1, 2010, 29 pages, IP.com.

Internet Society Requests for Comment, GSAKMP: Group Secure Association Key Management Protocol (RFC4535), IP.com No. 000137671, Jun. 1, 2006, 108 pages, IP.com.

Intel Corporation et al., "Introduction and Common Cryptographic Elements Book", Advanced Access Content System (AACS), Oct. 26, 2012, 102 pages, Advanced Access Content System, http://www.aacsla.com.

\* cited by examiner

PRE-AUTHORIZATION OF PUBLIC KEY INFRASTRUCTURE

BACKGROUND

As technology becomes ubiquitous in society, security becomes more and more important. This is especially true for content creators (e.g., musicians, actors, music studios, movie studios, etc.). Because the delivery medium for entertainment is so rapidly evolving, it becomes increasingly difficult for companies and individuals to monitor and manage copyrighted material. This has led to a large increase in the interest of Digital Rights Management (DRM). DRM can be used to restrict usage and/or unauthorized but effective duplication or redistribution of proprietary hardware, software and copyrighted works. The term DRM is also sometimes referred to as "copy protection," "technical protection measures," "copy prevention," or "copy control."

Some methods of DRM use digital certificates and/or public key infrastructure (PKI). PKI enables the secure electronic transfer of information between two or more devices without requiring both parties to have prior knowledge of a shared secret key (such as required in solely symmetric key encryption). Standards have been developed for various implementations, such as X.509, which is a standard for PKI and privilege management infrastructure (PMI). However, problems still exist, particularly when the private key corresponding to the subject public key within a certificate is suspected of having been compromised and therefore needs to be revoked. Thus, additional methods are needed to address the shortcomings of the current methods used for ensuring content security.

BRIEF SUMMARY

In summary, one aspect of the invention provides a method for pre-authorizing public key infrastructure communication between entities, the method comprising: utilizing at least one processor to execute computer code that performs the steps of: determining if pre-authorization is required from a remote device to establish a communication channel between a first entity and a second entity; establishing a shared secret value between the first entity and the remote device; receiving, at the second entity, from the remote device, proof of pre-authorization, thereby pre-authorizing communication between the first and second entity, wherein the pre-authorization is based on the shared secret value; and storing the proof of pre-authorization for any subsequent communication with the first entity.

Another aspect of the invention provides an apparatus for pre-authorizing public key infrastructure communication between entities, the apparatus comprising: at least one processor; and a computer readable storage medium having computer readable program code embodied therewith and executable by the at least one processor, the computer readable program code comprising: computer readable program code that determines if pre-authorization is required from a remote device to establish a communication channel between a first entity and a second entity; computer readable program code that establishes a shared secret value between the first entity and the remote device; computer readable program code that receives, at the second entity, from the remote device, proof of pre-authorization, thereby pre-authorizing communication with the first entity, wherein the pre-authorization is based on the shared secret value; and computer readable program code that stores the proof of pre-authorization for any subsequent communication with the first entity.

An additional aspect of the invention provides a computer program product for pre-authorizing public key infrastructure communication between entities, the computer program product comprising: a computer readable storage medium having computer readable program code embodied therewith, the computer readable program code comprising: computer readable program code that determines if pre-authorization is required from a remote device to establish a communication channel between a first entity and a second entity; computer readable program code that establishes a shared secret value between the first entity and a remote device; computer readable program code that receives, at the second entity, from the remote device, proof of pre-authorization, thereby pre-authorizing communication with the first entity, wherein the pre-authorization is based on the secret value; and computer readable program code that stores the proof of pre-authorization for any subsequent communication with the first entity.

A further aspect of the invention provides a method for incorporating pre-authorization into PKI-based pairwise relying-party communications, comprising: a first relying-party communicating with a second relying-party to determine whether local possession of proof of pre-authorization at the first relying party is required for successfully establishing a shared secret value with said second relying party; said first relying-party establishing a shared secret value with a third-party server for the purpose of acquiring said proof of pre-authorization from said third-party server if said local possession of proof of pre-authorization at the first relying party is required and is not available from accessible storage; and said first relying-party incorporating said proof of pre-authorization into setup communications regarding said shared secret value with said second relying-party if: (i) said local possession of proof of pre-authorization at the first relying party is required and (ii) demonstration of said local possession of proof of pre-authorization at said first relying-party is required by said second relying-party.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
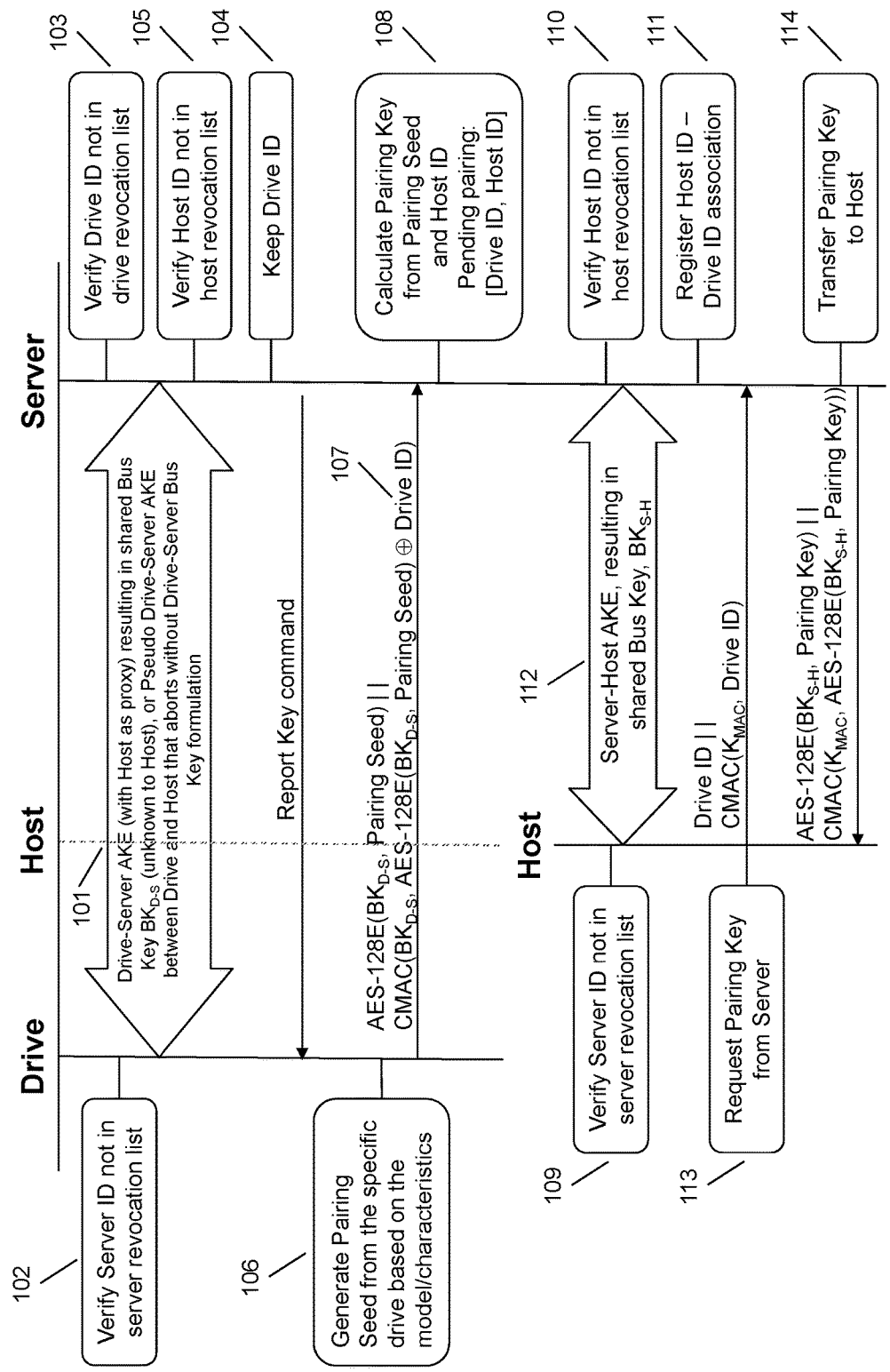
FIG. 1 illustrates an example method of pairing flows involving a pairing server.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

As discussed herein, maintaining control over the playback and/or copying of copyrighted material is an ongoing issue. Thus, an embodiment may address this problem via providing a way to effectively layer on system-level monitoring and optional control of communications between entities (e.g., disk drives, storage mediums, optical drives, hosts media players, etc.) that have each been equipped with a digital certificate. For simplicity purposes, reference will be made throughout the description to public and private keys. It should be understood by one skilled in the art this is in reference to public-key cryptography, which comprises methods of encryption, decryption, key establishment (i.e., key agreement and key transport), digital signature generation, and/or digital signature verification well known in the art.

Currently, one way to establish secure communications between two entities (e.g., an optical drive and a host media player, as further used herein by way of example) that are unauthorized to each other (e.g., have not been jointly cryptographically provisioned) is solely through reliance on digital certificates. Generally, each digital certificate may explicitly include (or enable reconstruction of) a public key for which the alternate entity that is associated with (or owns the digital certificate) has access to a corresponding private key. Additionally, each digital certificate that explicitly includes a public key bears a digital signature that is verifiable by other entities (e.g., the pairing entity). Typically, this digital signature is generated by a third party authority that the entity (e.g., the relying party) has reason to trust. For example, such entity (e.g., the relying entity) may have been directly or indirectly provisioned with the public key of the authority that is used during the digital signature verification.

Thus, the relying entity may have been directly provisioned with the authority's public key, or may have been indirectly provisioned with the authority's public key. Moreover, a certificate containing the authority's public key may appear within a hierarchy of certificates, wherein the certificate containing the authority's public key exists at some level lower in the hierarchy than does a public key with which the relying entity has been directly provisioned. It is also possible that such certificates may be issued within a Public Key Infrastructure (PKI) framework. By way of example, the certificates may come in or adhere to a standardized format, e.g., X.509, which is a Telecommunication Standardization Sector (ITU-T) cryptography standard.

The Blu-ray Disc Association is readying an enhanced Blu-ray format that provides for improved video resolution as well as other features. Included in this update is Advanced Access Content System (AACS), version two (2), which will be an enhanced encryption-based content protection method utilized for the enhanced format. Generally, in existing AACS, version 1, a drive certificate and host certificate are used bi-directionally in order to authenticate the communication between a device (e.g., an optical drive, storage medium, etc.) and a host (e.g., computer, media player, etc.). Detection of misuse and reaction thereto has generally been slow. The detection of misuse may be done via forensic means that are independent of the actual communication between the drive and host. If such detection results in revocation of particular drive(s) and/or host(s), other drives and hosts do not become aware of such revocation until a storage medium (e.g., physical disc) with the updated information (e.g., a newer revocation list) is inserted into the device (e.g., optical disc drive), at which point the drive checks the host revocation list/Host Certificate Revocation List (HRL) and the host checks the drive revocation list/Drive Certificate Revocation List (DRL).

Accordingly an embodiment provides a new feature for use in connection with the updated or second version of AACS, which allows a connection-initialization technique of "pairing" drives and hosts. This allows an authority or administrator, e.g., an AACS Licensing Administrator, to become aware of all connections requested and granted. In particular, notifications received from hosts enable systematic tracking of how many, and which, drives connect to a specific host and vice-versa.

Thus, an embodiment allows detection of misuse of cryptographic credentials and ensures that timely remedial action may be taken. In one embodiment, a positive authorization step by a backend (e.g., an AACS server) may propagate in real-time to a relying host (e.g., a computer, a media player, etc.) for use with the relying device (e.g., an optical or data drive). Such authorization is verifiable for legitimacy by the host and the device independently of each other. Additionally, this cryptographic token-based authorization may be reusable by a host for subsequent communication sessions with the same device. This reduces the requirement to be constantly connected to a network, and also reduces the nuisance associated with the checking process that can negatively impact the end user experience. The above method is effective for a given host and given device if at least one of the device or host remains compliant.

Embodiments discussed herein may be applicable to a variety of uses, e.g., in securing communications between smart phones and components or peripheral devices with which the smart phones may locally communicate, such as cryptographically enabled protective cases or cryptographically enabled storage media. It should further be appreciated that one skilled in the art could apply the concepts discussed herein in any instance where encryption is necessary and the risks or threats to that encryption are high enough to warrant a revocation list. However, for purposes of simplicity, non-limiting examples of a drive and host are generally discussed herein.

In the example of a host and a drive, it is desirable to leverage the communications protocol between a host/player and drive in a special initialization mode. Such a mode may entail the drive and a pairing server communicating through the host (e.g., the host acting as a proxy) with which the drive is intended to be paired. In a preferred embodiment the host stores the relevant pairing information in accessible non-volatile memory, in order to obviate the need to regularly repeat the pairing procedure.

An additional embodiment or aspect makes use of symmetric device key(s) held by the host. The pairing server is provisioned with a preferably non-invertible functional value of such device key(s) by a Key Generation Facility that has access to each device's device key(s). Each device may then hold at least one device key that is unique to it. Such symmetric device key(s) are in addition to the private key held by the host that corresponds to the public key contained within its digital certificate.

Such a system provides a technical improvement over current systems for encrypted data transfer (e.g., for use in a media playback context). As an example, the system is not at the mercy of the physical media in terms of updating a revocation list. Instead, upon failure of authentication or failure of media playback, the system provides for reach-out to an updated backend server that ensures a centralized location containing the most current revocation list.

Referring now to FIG. 1, in one embodiment, a first entity (made reference to in FIG. 1 as "drive") may attempt to establish a secret (e.g., encrypted) communication path (i.e., channel) with a third party server (referenced to in FIG. 1 as server) 101. In order to establish this communication path, the drive checks that the server identifier is not contained within the latest locally available (e.g., stored in non-volatile storage medium within the drive) Server Certificate Revocation List (SRL) at 102.

In an embodiment, the server may verify that the drive identifier (ID) is not contained within the current Drive Certificate Revocation List (DRL) at 103. Once the server verifies the Drive Certificate against the DRL, it may store the drive identifier at 104. The server may store the Drive ID in order to increase the speed and accuracy of future interactions with the drive or associated host.

Additionally, an embodiment may verify that the second entity (referred to in FIG. 1 as host) is not contained within the Host Certificate Revocation List (HRL) at 105. The host may be verified at this stage, or alternatively at a subsequent stage of the process shown in FIG. 1. In a further embodiment, by way of non-limiting example, the SRL, DRL, and HRL may be contained in separate lists, or consolidated into a larger master list. Additionally or alternatively, they may be included in some form in each other's list. For example, the SRL may be a sub-portion or section of the HRL.

Once the server and drive have verified each other's credentials independently, an Authenticated Key Exchange (AKE) takes place between the two entities at 101. Thus, in an embodiment, a shared Bus Key (e.g., $BK_{Drive\text{-}Server}$) is generated and used to ensure a private communication channel between the drive and server at 101. In one embodiment, the host device may act as a proxy because the drive is unable to connect to a network or the Internet. However, because an encrypted and preferably also authenticated channel (101) is being used, the host cannot access or undetectably modify the information being transferred back and forth between the drive and the server.

In an embodiment, the drive generates a pairing seed at 106. The pairing seed is derived based on the specific drive (e.g., first entity). An embodiment then passes the pairing seed to the server using the encrypted channel (101) at 107. In one embodiment, the pairing seed may be encrypted using a known standard (e.g., Advanced Encryption Standard (AES)). By way of non-limiting example and as shown in FIG. 1, 128-bit AES encryption is used to encrypt the pairing seed at 106. In a further aspect of the embodiment, a Cipher-based Message Authentication Code (CMAC) algorithm, which is a block cipher-based message authentication code algorithm, may be used at 106 to pass the pairing seed from the drive to the server.

Once the server receives the pairing seed, a host-specific pairing key is derived from the pairing seed by the server (e.g., a Drive-Host Pairing Server) at 107. In an embodiment, the pairing key is derived from or based on the pairing seed and host identifier in some combination. Similar to the aforementioned secret (e.g., encrypted) communication path between the drive and server, in one embodiment, a communication path may be established between the host and the server. In order to establish this communication path, the host may verify that the server identifier is not contained within the latest locally available Server Certificate Revocation List (SRL) at 109. As discussed herein, the locally available SRL may be updated in various ways, but in some instances is still not the most current list available.

In an embodiment, the server may verify that the host identifier is not contained within the current Host Certificate Revocation List (HRL) at 110. Once the server verifies the Host Certificate against the HRL, it may register the host ID with the stored drive ID and associate them both with each other at 111.

Once the server and host have verified each other's credentials independently, a Server-Host Authenticated Key Exchange (AKE) takes place between the two entities at 112. Thus, in an embodiment, a shared Bus Key (e.g., $BK_{Server-Host}$) is generated and used to ensure a private communication channel between the host and server at 112. Because the host device can connect directly to a network, there may be no requirement to use another system component as a proxy, unlike the case of a drive without direct network connectivity as discussed herein.

Once the secure channel is created at 112, the host may request the pairing key from the server at 113. As discussed herein, the pairing key may be required for the host to perform encrypted communications with the drive. Thus, an embodiment may in response to the request, or proactively (i.e., without need of the request), transfer the pairing key, generated at 108, to the host at 114. The pairing key may be delivered to the specific licensed host via a Player-Server AKE (also denoted as Server-Host AKE at 112) protocol. During the Player-Server AKE protocol, in addition to the use of digital certificates (and corresponding private keys) of the licensed host and the drive-host pairing server, respectively, use may also be made of device key(s) that have been provisioned to the host and values derived from these device keys that have been provisioned to the drive-host pairing server by the Key Generation Facility (KGF).

In a further embodiment, a value, $K_{MAC}$, is computed by the host as a one-way function of its provisioned symmetric device key(s), and is provisioned to the drive-host pairing server (for all hosts) by the KGF. The device key set issued to a host is used to recover plaintext content from the encrypted content on the disc in the drive. In one embodiment, this recovery may take place after a first decrypting is carried out based on knowledge of the bus key shared between the drive and the host (e.g., Bus Key $BK_{Drive-Host}$) as a result of successful Drive-Host AKE (e.g., AACS, version 2, Drive-Host AKE).

Accordingly, and referring to FIG. 2, a drive may be programmed to request or require proof of pre-authorization from a host, as described in connection with FIG. 1. As known, in a conventional AACS technique, a drive certificate and host certificate are used to bi-directionally authenticate communication between an optical drive (simply "drive" in FIG. 2) and a host (e.g., a personal computer, media player, etc.). As discussed in more detail herein, this can lead to detection of misuse and reaction to misuse being delayed. Such detection may be through forensic means that are independent of the actual communication between the drive and host. If such detection results in revocation of particular drive(s) and/or host(s), other drives and/or hosts do not become aware of such revocation until a disc with the updated information (comprised, e.g., of one or more updated revocation lists) is inserted into the optical drive.

Figure 2:
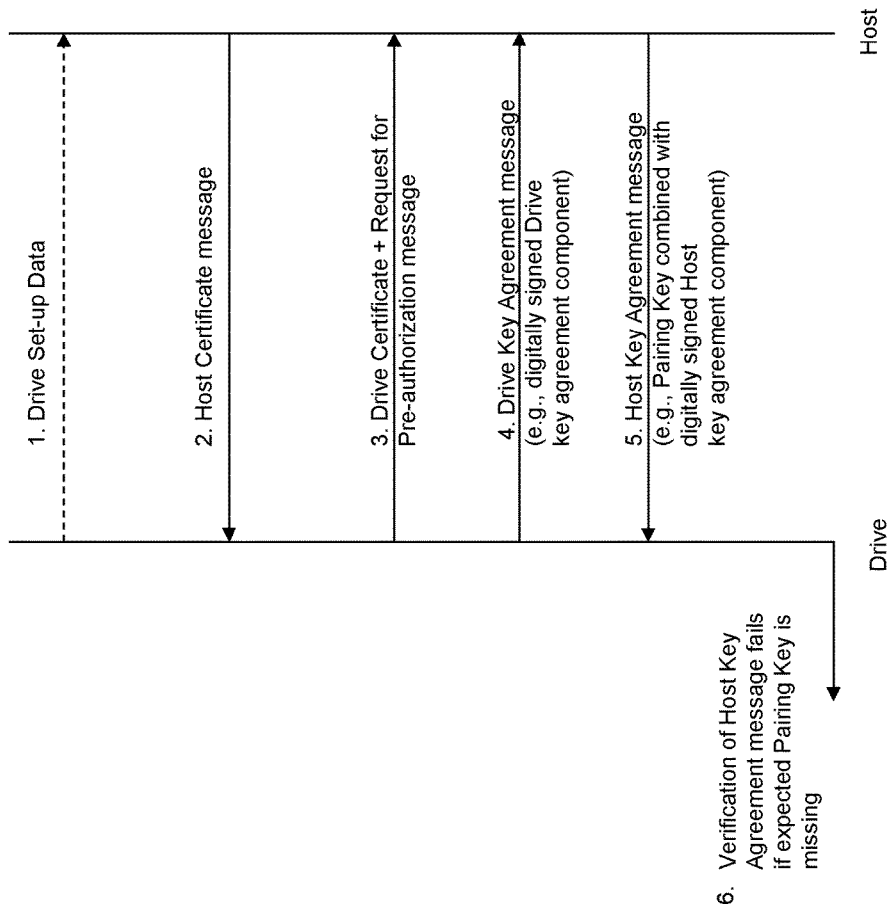
FIG. 2 illustrates an example method of drive-host pairing.

In an embodiment, therefore, as illustrated in FIG. 2, the bi-directional authentication communication is augmented with enhanced content protection due to inclusion of a pre-authorization step facilitated by a server that pairs the host and drive, as described in connection with FIG. 1. As shown in FIG. 2, in illustrated step 1 disc set-up data are communicated from the drive to the host, as previously known in the AACS host-drive authentication protocol. Included in the step 1 is a check of the disc lead-in area to determine which of the host revocation list stored on the disc and the host revocation list stored on the drive is to be used. In an embodiment, this is supplemented to include a check of the revocation status of the drive-host pairing server certificate.

The disc set-up data communicated to the host in step 1 of FIG. 2 permit the host to check the disc set-up data to determine which of the drive revocation list of the disc and the drive revocation list of the host is to be used. An embodiment supplements this by including the revocation status of the drive-host pairing server certificate, which may be updated (in this example by the host) if the version stored on the disc is preferred (e.g., a higher/newer version).

As illustrated in step 2 of FIG. 2, the host generates a Host Certificate message, Hn(256-bit)||Hcert, where Hn=SHA-256 (Nonce) (for example), and communicates this to the drive. The drive in turn may verify the Hcert and check whether or not the host identifier appears in the host revocation list.

As illustrated in step 3, the drive may likewise generate a Drive Certificate+Request for Pre-authorization message. The Drive Certificate component of the Drive Certificate+Request for Pre-authorization message that is communicated to the host is comprised of Dn(256-bit) II Dcert, where Dn=SHA-256(Nonce) (for example). The host for its part may verify that the Dcert received from the drive is valid and check whether or not the drive identifier appears in the drive revocation list. In an embodiment, the drive may additionally indicate to the host (e.g., in step 3 or at another time) that the drive is requesting proof of pre-authorization from the host. This indication forms the Request for Pre-authorization component of the Drive Certificate+Request for Pre-authorization message, if it is included within step 3. That is, the drive may include, for example in the available bits used to communicate the drive certificate, that the drive requires proof that the host has been pre-authorized to communicate with the drive via server pairing. In an embodiment, this is accomplished via the host using a pairing key to formulate a response to the drive, as described further herein.

By way of non-limiting example, the drive may communicate in step 4 a Drive Key Agreement message as the host-drive authentication protocol dictates (e.g., generate a verification value, Dv(512-bit)||Dsig, where Dv=Dk G on elliptic curve, and Dsig, =AACS_Sign(Dpriv, Hn||Dv)). Here, the drive generates Dk to be used in computation of Dv.

This Drive Key Agreement message, Dv(512-bit)||Dsig, is received by the host, which verifies it according to the bi-directional verification protocol (e.g., utilizing AACS_Verify(Dpub, Dsig, Hn||Dv)). Likewise, in step 5 of FIG. 2, the host generates a Host Key Agreement message, Hv(512-bit)||Hsig, by producing Hk, where Hv=Hk G on elliptic curve, and Hsig=AACS_Sign(Hpriv, Dn||Hv). In one embodiment, the host is required to replace Hsig (normally utilized in the bi-directional verification communications, specifically to sign the concatenation of Dn and Hv) by the value comprised of the exclusive-OR addition of Hsig and the pairing key (where the pairing key is obtained from the drive-host pairing server, as described in FIG. 1). Thus, the return response in step 5 is a Host Key Agreement Message that will be usable by the drive only if the pairing key used by the host is the pairing key expected by the drive due to its seeding of the drive-host pairing server with a pairing seed value, as described herein.

An authorized or licensed host retains each pairing key it acquires in secure non-volatile memory. During the drive-host authentication protocol, as by way of example outlined in FIG. 2, the pairing key is used by the licensed host to prove to the corresponding authorized or licensed drive that pairing had been successfully established via communications with the drive-host pairing server. The drive derives the particular pairing key needed from its pairing seed in order to verify such proof. In one embodiment, such proof can take the form of a value transmitted from the host to the drive (e.g., as illustrated in step 5 of FIG. 2) that is comprised of the exclusive-or of: (a) a function of the pairing key and (b) a digital signature generated by the host. Such digital signature will verify successfully by the drive (after exclusive-or of (c) the drive's computation of the function of the pairing key to (d) the value it receives from the host) only if the host was in possession of such function of the pairing key. If all six steps illustrated in FIG. 2 complete successfully, the drive and host can communicate successfully using a shared Bus Key, BK. In one embodiment, BK is computed by the drive as: BK=[x-coordinate of Dk Hv on elliptic curve]$_{lsb\ 128}$. In such an embodiment, BK is computed by the host as: BK=[x-coordinate of Hk Dv on elliptic curve]$_{lsb\ 128}$.

A fully-compatible early-exit version of the drive-server authenticated key exchange (AKE), which may be referred to as a pseudo drive-server AKE, optionally may be used offline of the drive-host pairing server (e.g., as a means for the host to deliver to the drive independently verifiable information regarding the updated status of the drive-host pairing server). Such independently verifiable information can take the form of a drive-host pairing server certificate.

Figure 3:
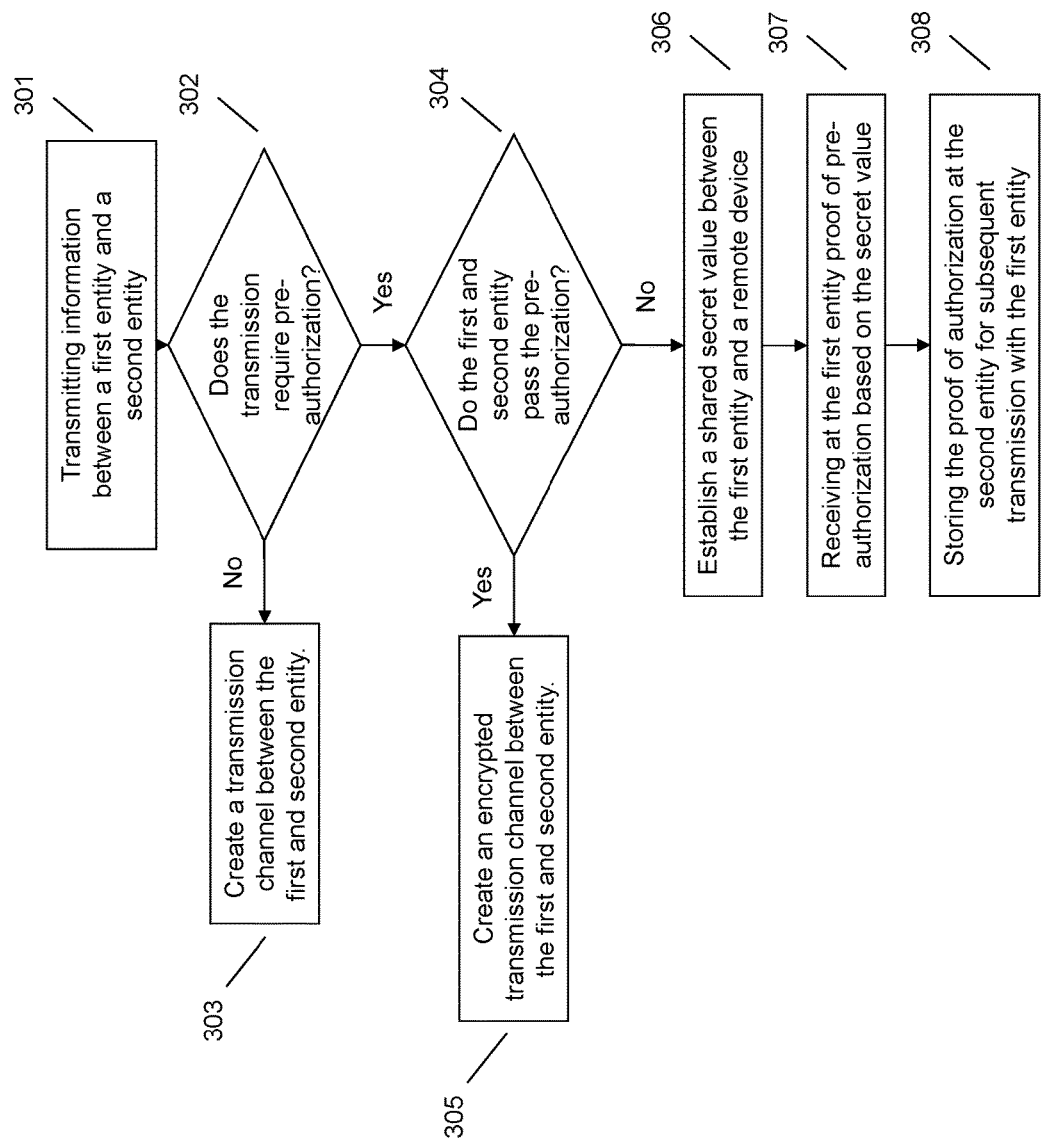
FIG. 3 illustrates a method of pre-authorization of public key infrastructure.

Referring now to FIG. 3, as discussed in detail herein, an embodiment may transmit information between a first entity (e.g., an optical drive, storage medium, etc.) and a second entity (e.g., an information handling device, media playing device, etc.) at 301. Based on this transmission, an embodiment may determine if pre-authorization is required to establish a transmission channel between the two entities at 302. For example, allowing an optical drive to read a media disc and pass the encoded information to a computer (or other information handling device). If no pre-authorization is required, a transmission channel may be created at 303.

Alternatively, if pre-authorization is required, such as for example to transmit encrypted information between the entities as discussed herein, an embodiment may determine if the first and/or second entity pass the pre-authorization test at 304. If the first entity (referred to herein as "drive") and the second entity (referred to herein at "host") pass the pre-authorization test, an embodiment may create an encrypted transmission channel between the first and second entity at 305.

However if one or both of the entities fail the pre-authorization step at 304, an embodiment may establish an encrypted connection to a remote device or remote entity (referred to herein as "server") and transport or pass a secret value to be shared with the remote device or remote entity at 306. The shared secret value may be, for example, a pairing seed, transmitted in encrypted form, as discussed herein. In a further embodiment, and as discussed herein, the second entity may act as a proxy for the transmission between the first entity and the remote device or remote entity. However, due to the encrypted nature of the secret message, the contents of the message are inaccessible to the second entity. Generally, in cryptography, a shared secret may be a piece of data, known only to the parties involved in a secure communication. The shared secret can be a password, a passphrase, a big number or an array of randomly chosen bytes.

In one embodiment, once the secret value is received by the remote device, proof of pre-authorization can be generated for the second entity. This proof of pre-authorization may be for example a pairing key. The remote device then passes this proof of pre-authorization on to the second entity at 307, where this transmission is in encrypted form. The second entity can, as discussed herein, use the proof of pre-authorization for establishing an encrypted transmission channel with the first entity, such as that at 305. Additionally or alternatively, the proof may be stored at the second entity for subsequent transmission requests at 308. Thus, when the next transmission (such as that at 301) takes place, the first and second entity will pass the pre-authorization step (such as that at 304) and be able to create an encrypted transmission channel.

Figure 4:
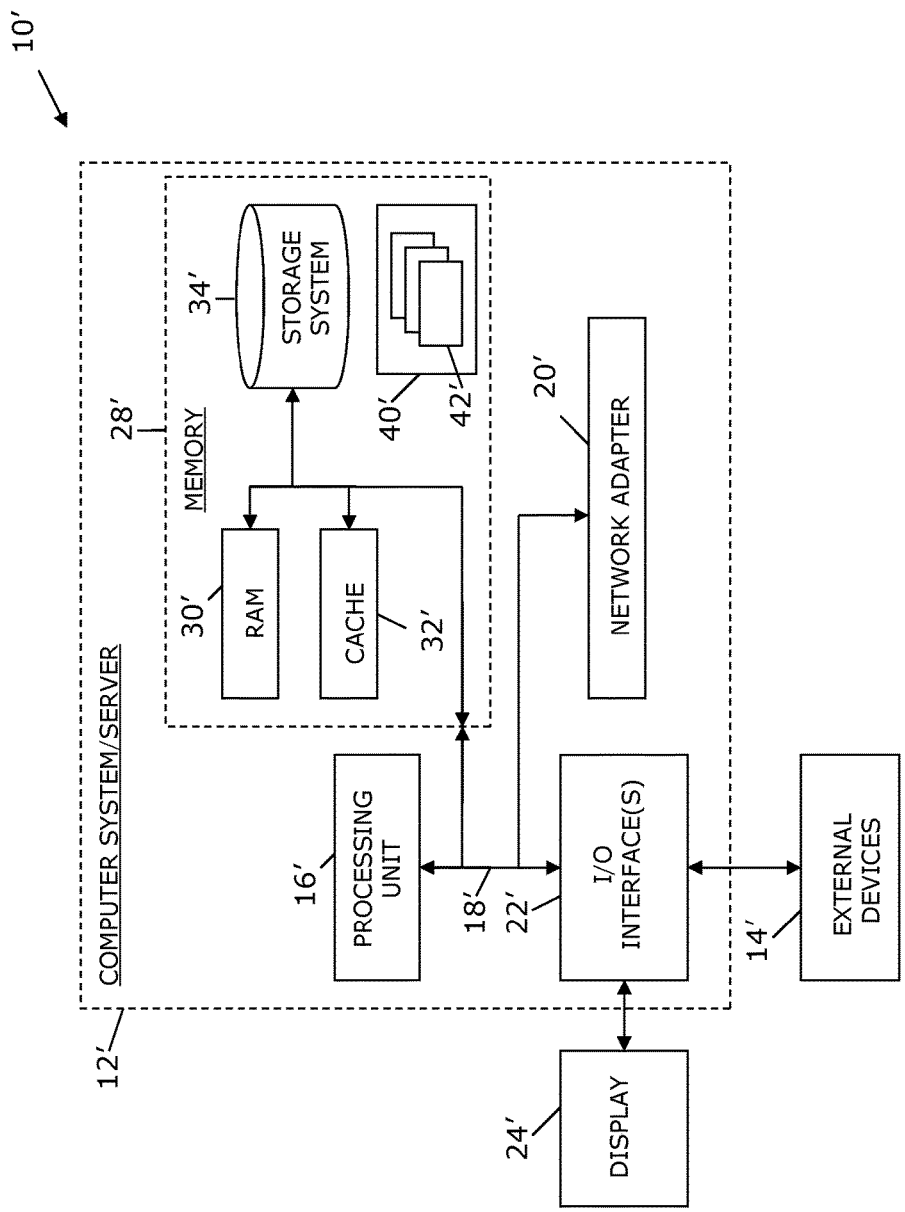
FIG. 4 illustrates a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method for pre-authorizing public key infrastructure communication between entities, the method comprising: utilizing at least one processor to execute computer code that performs the steps of: determining pre-authorization is required from a remote device to establish a communication channel between a first entity and a second entity, wherein the first entity and the second entity are to be paired, wherein the pre-authorization verifies credentials of each of the first entity and the second entity to determine that each of the first entity and the second entity are authorized to communicate with each other and wherein the pre-authorization allows for encrypted data transfer between the first entity and the second entity, wherein the remote device comprises a licensing administrator that verifies the credentials of both the first entity and the second entity to prevent misuse of cryptographic credentials and provides authorization for communications between the first entity and the second entity; establishing, via an authenticated key exchange, an encrypted communication channel between the first entity and the remote device; establishing, responsive to determining that pre-authorization is required and over the encrypted communication channel, a shared secret value between the first entity and the remote device, wherein the establishing a shared secret value is based upon a pairing key derived from a pairing seed generated by the first entity and wherein the shared secret value is further established by transmitting the encrypted pairing seed from the first entity to the remote device, wherein the second entity acts as a proxy between the first entity and the remote device for transmission of the encrypted pairing seed; wherein the pairing key is generated by: generating and encrypting the pairing seed at the first entity; transmitting, through the encrypted communication channel, the encrypted pairing seed from the first entity to the remote device through the second entity, wherein the second entity acts as a proxy for communication between the first entity and the remote device and wherein the second entity cannot access the encrypted pairing seed; deriving, at the remote device, the pairing key from the encrypted pairing seed and an identifier of the second entity, wherein the pairing key is specific to the second entity; creating, at the remote device, proof of pre-authorization using the derived pairing key; receiving, at the second entity, from the remote device through a private communication channel established between the second entity and the remote device, proof of pre-authorization, thereby pre-authorizing communication between the first and second entity and establishing an encrypted communication channel between the first and second entity, wherein the pre-authorization is based on the shared secret value; and storing, at the second entity, the proof of pre-authorization for any subsequent communication of the second entity with the first entity.

2. The method of claim 1, wherein first entity is a device selected from the group consisting of: a physical drive, an optical drive, and a storage device.

3. The method of claim 1, wherein the second entity is an information handling device.

4. The method of claim 1, wherein the second entity is undetectable to the first entity when acting as a proxy.

5. The method of claim 1, wherein the pairing seed corresponding to the encrypted pairing seed is not accessible to the second entity.

6. The method of claim 1, wherein the proof of pre-authorization for the second entity is derived based on the shared secret value.

7. The method of claim 1, wherein both the transmitting and the receiving utilize public-key cryptography.

8. The method of claim 1, wherein the first entity comprises an optical drive and wherein the second entity comprises an optical drive player.

9. An apparatus for pre-authorizing public key infrastructure communication between entities, the apparatus comprising: at least one processor; and a computer readable storage medium having computer readable program code embodied therewith and executable by the at least one processor, the computer readable program code comprising: computer readable program code that determines pre-authorization is required from a remote device to establish a communication channel between a first entity and a second entity, wherein the first entity and the second entity are to be paired, wherein the pre-authorization verifies credentials of each of the first entity and the second entity to determine that each of the first entity and the second entity are authorized to communicate with each other and wherein the pre-authorization allows for encrypted data transfer between the first entity and the second entity, wherein the remote device comprises a licensing administrator that verifies the credentials of both the first entity and the second entity to prevent misuse of cryptographic credentials and provides authorization for communications between the first entity and the second entity; computer readable program code that establishes, via an authenticated key exchange, an encrypted communication channel between the first entity and the remote device; computer readable program code that establishes, responsive to determining that pre-authorization is required and over the encrypted communication channel, a shared secret value between the first entity and the remote device, wherein the establishing a shared secret value is based upon a pairing key derived from a pairing seed generated by the first entity and wherein the shared secret value is further established by transmitting the encrypted pairing seed from the first entity to the remote device, wherein the second entity acts as a proxy between the first entity and the remote device for transmission of the encrypted pairing seed; wherein the pairing key is generated by: generating and encrypting the pairing seed at the first entity; transmitting, through the encrypted communication channel, the encrypted pairing seed from the first entity to the remote device through the second entity, wherein the second entity acts as a proxy for communication between the first entity and the remote device and wherein the second entity cannot access the encrypted pairing seed; deriving, at the remote device, the pairing key from the encrypted pairing seed and an identifier of the second entity, wherein the pairing key is specific to the second entity; computer readable program code that creates, at the remote device, proof of pre-authorization using the derived pairing key;

computer readable program code that receives, at the second entity, from the remote device through a private communication channel established between the second entity and the remote device, proof of pre-authorization, thereby pre-authorizing communication with the first entity and establishing an encrypted communication channel between the first and second entity, wherein the pre-authorization is based on the shared secret value; and computer readable program code that stores the proof of pre-authorization for any subsequent communication with the first entity.

10. A computer program product for pre-authorizing public key infrastructure communication between entities, the computer program product comprising: a computer readable storage medium having computer readable program code embodied therewith, the computer readable program code comprising: computer readable program code that determines pre-authorization is required from a remote device to establish a communication channel between a first entity and a second entity, wherein the first entity and the second entity are to be paired, wherein the pre-authorization verifies credentials of each of the first entity and the second entity to determine that each of the first entity and the second entity are authorized to communicate with each other and wherein the pre-authorization allows for encrypted data transfer between the first entity and the second entity, wherein the remote device comprises a licensing administrator that verifies the credentials of both the first entity and the second entity to prevent misuse of cryptographic credentials and provides authorization for communications between the first entity and the second entity; computer readable program code that establishes, via an authenticated key exchange, an encrypted communication channel between the first entity and the remote device; computer readable program code that establishes, responsive to determining that pre-authorization is required and over the encrypted communication channel, a shared secret value between the first entity and the remote device, wherein the establishing a shared secret value is based upon a pairing key derived from a pairing seed generated by the first entity and wherein the shared secret value is further established by transmitting the encrypted pairing seed from the first entity to the remote device, wherein the second entity acts as a proxy between the first entity and the remote device for transmission of the encrypted pairing seed; wherein the pairing key is generated by: generating and encrypting the pairing seed at the first entity; transmitting, through the encrypted communication channel, the encrypted pairing seed from the first entity to the remote device through the second entity, wherein the second entity acts as a proxy for communication between the first entity and the remote device and wherein the second entity cannot access the encrypted pairing seed; deriving, at the remote device, the pairing key from the encrypted pairing seed and an identifier of the second entity, wherein the pairing key is specific to the second entity; computer readable program code that creates, at the remote device, proof of pre-authorization using the derived pairing key; computer readable program code that receives, at the second entity, from the remote device through a private communication channel established between the second entity and the remote device, proof of pre-authorization, thereby pre-authorizing communication with the first entity and establishing an encrypted communication channel between the first and second entity, wherein the pre-authorization is based on the shared secret value; and computer readable program code that stores the proof of pre-authorization for any subsequent communication with the first entity.

11. The computer program product of claim 10, wherein the first entity is a device selected from the group consisting of: a physical drive, an optical drive, and a storage device.

12. The computer program product of claim 10, wherein second entity is an information handling device.

13. The computer program product of claim 10, wherein the second entity is undetectable to the first entity when acting as a proxy.

14. The computer program product of claim 10, wherein the pairing seed corresponding to the encrypted pairing seed is not accessible to the second entity.

15. The computer program product of claim 10, wherein the proof of pre-authorization for the second entity is derived based on the shared secret value.

16. The computer program product of claim 10, wherein the transmitting and receiving utilize public-key cryptography.

* * * * *